US008923110B2

(12) United States Patent
Cheng et al.

(10) Patent No.: US 8,923,110 B2
(45) Date of Patent: Dec. 30, 2014

(54) CHANNEL STATE INFORMATION RECONSTRUCTION FROM SPARSE DATA

(75) Inventors: Jung-Fu Cheng, Fremont, CA (US); Kambiz Zangi, Chapel Hill, NC (US); Dennis Hui, Cary, NC (US); Leonid Krasny, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 113 days.

(21) Appl. No.: 12/555,973

(22) Filed: Sep. 9, 2009

(65) Prior Publication Data

US 2010/0271931 A1    Oct. 28, 2010

Related U.S. Application Data

(60) Provisional application No. 61/172,484, filed on Apr. 24, 2009.

(51) Int. Cl.
| | |
|---|---|
| H04J 11/00 | (2006.01) |
| H04B 7/02 | (2006.01) |
| H04B 17/00 | (2006.01) |
| H04L 1/20 | (2006.01) |
| H04L 25/02 | (2006.01) |
| H04L 1/00 | (2006.01) |
| H04B 7/06 | (2006.01) |

(52) U.S. Cl.
CPC ........ *H04B 17/0047* (2013.01); *H04L 25/0224* (2013.01); *H04L 25/022* (2013.01); *H04L 1/0009* (2013.01); *H04B 7/024* (2013.01); *H04L 1/0026* (2013.01); *H04L 25/0212* (2013.01); *H04L 1/0019* (2013.01); *H04L 1/20* (2013.01); *H04B 7/0639* (2013.01); *H04L 1/0003* (2013.01); *H04B 7/0626* (2013.01); *H04B 17/006* (2013.01)
USPC ........................................ 370/210

(58) Field of Classification Search
CPC ............................ H04B 7/0626; H04B 17/006
USPC .......................................... 370/210
See application file for complete search history.

(56) References Cited

U.S. PATENT DOCUMENTS 7,675,894 B2 *  3/2010  Wunder et al. ................ 370/343
8,208,397 B2    6/2012  Cheng et al.
(Continued)

FOREIGN PATENT DOCUMENTS

EP     1 786 133 A1    5/2007
JP     2004-266814 A   9/2004
(Continued)

OTHER PUBLICATIONS

Abe K. et al., "A study on Reduction of the Amount of CSI Feedback in MIMO-OFDM Eigenbeam-Space Division Multiplexing Systems", The Institute of Electronics, Information and Communication Engineers Technical Report, Feb. 27, 2008, vol. 107, No. 518, pp. 293-298.

(Continued)

*Primary Examiner* — Mark Rinehart
*Assistant Examiner* — Maharishi Khirodhar

(57) ABSTRACT

Accurate downlink channel estimates are calculated based on infrequently transmitted Channel State Information (CSI) feedback data from a UE 20. A plurality of non-uniformly spaced digital CSI feedback samples, representing the frequency response of a downlink communication channel, is received from the UE. The received CSI feedback samples are demodulated and inverse quantized. A time domain tap delay channel model is generated from the inverse quantized CSI feedback samples. The time domain tap delay channel model may be frequency-transformed to obtain a reconstructed frequency response of the downlink communication channel in the frequency domain. Alternatively, channel delays may be estimated based on prior delays and/or known references signals transmitted on the uplink. Channel estimates between CSI reporting instances may be predicted, such as by a sample & hold or a linear predictor. The delays may be presumed fixed, and Kalman filter coefficients evolved over time.

21 Claims, 9 Drawing Sheets

(56) References Cited

U.S. PATENT DOCUMENTS

| | | |
|---|---|---|
| 2004/0218519 A1 | 11/2004 | Chiou et al. |
| 2005/0232156 A1* | 10/2005 | Kim et al. ................ 370/236 |
| 2008/0187061 A1* | 8/2008 | Pande et al. ................ 375/260 |
| 2009/0016425 A1 | 1/2009 | Hui et al. |

FOREIGN PATENT DOCUMENTS

| | | |
|---|---|---|
| JP | 2007-143143 A | 6/2007 |
| WO | WO 2008/052479 A2 | 5/2008 |

OTHER PUBLICATIONS

Motoyoshi K. et al., "A study on CSI Feedback Bandwidth Reduction Method for FDD-based OFDM Systems", The Institute of Electronics, Information and Communication Engineers, communication society meeting papers 1, Sep. 7, 2005, p. 428, B-5-28.

Duel-Hallen A. et al., "Long Range Prediction and Reduced Feedback for Mobile Radio Adaptive OFDM Systems", Wireless Communications, IEEE Transactions, Oct. 2006, pp. 2723-2733.

Wong I. et al., "Joint Channel Estimation and Prediction for OFDM Systems", Global Telecommunications Conference, GLOBECOM '05, IEEE, Dec. 2, 2005, vol. 4, pp. 2255-2259.

Kayama H. et al., "A Study on the Accurate Channel Estimation Method Applying Sinc Function Based Channel Replica for a Broadband OFDM Wireless Communication System", The Institute of Electronics, Information and Communication Engineers Technical Report, Aug. 16, 2007, vol. 1 07, No. 192, pp. 99-104, RCS2007-70.

Li Y. et al., "A Novel Scheme for Channel State Information Feedback in MIMO-OFDMA System", Circuits and Systems for Communications, 2008 ICCSC 2008. 4$^{th}$ IEEE International Conference, May 28, 2008, pp. 205-209.

3GPP TS 36.213, v8.5.0 (Dec. 2008), 3rd Generation Partnership Project; Technical Specification Group Radio Access Network; Evolved Universal Terrestrial Radio Access; Physical layer procedures (Release 8), Section 7.2.1.

* cited by examiner

CHANNEL STATE INFORMATION RECONSTRUCTION FROM SPARSE DATA

PRIORITY CLAIM

This application claims priority to U.S. Provisional Patent Application Ser. No. 61/172,484, filed Apr. 24, 2009, titled "Channel State Information Feedback by Digital Loopback," and incorporated herein by reference in its entirety.

TECHNICAL FIELD

The present invention relates generally to wireless communications, and in particular to an efficient system and method of estimating, at a wireless network, channel state information from sparse data transmitted by user equipment.

BACKGROUND

Wireless communication networks transmit communication signals in the downlink over radio frequency channels from fixed transceivers, known as base stations, to mobile user equipment (UE) within a geographic area, or cell. The UE transmit signals in the uplink to one or more base stations. In both cases, the received signal may be characterized as the transmitted signal, altered by channel effects, plus noise and interference. To recover the transmitted signal from a received signal, a receiver thus requires both an estimate of the channel, and an estimate of the noise/interference. The characterization of a channel is known as channel state information (CSI). One known way to estimate a channel is to periodically transmit known reference symbols, also known as pilot symbols. Since the reference symbols are known by the receiver, any deviation in the received symbols from the reference symbols (once estimated noise/interference is removed) is caused by channel effects. An accurate estimate of CSI allows a receiver to more accurately recover transmitted signals from received signals. In addition, by transmitting CSI from the receiver to a transmitter, the transmitter may select the transmission characteristics—such as coding, modulation, and the like—best suited for the current channel state. This is known as channel-dependent link adaptation.

Modern wireless communication networks are interference limited. The networks typically process transmissions directed to each UE in a cell independently. Transmissions to other UEs in the same cell are regarded as interference at a given UE—giving rise to the term inter-cell interference. One approach to mitigating inter-cell interference is Coordinated Multipoint (CoMP) transmission. CoMP systems employ numerous techniques to mitigate inter-cell interference, including MIMO channels, numerous distributed antennas, beamforming, and Joint Processing.

Joint Processing (JP) is a CoMP transmission technique currently being studied for Long Term Evolution (LTE) Advanced. In JP, transmissions to multiple UEs are considered jointly, and a global optimization algorithm is applied to minimize inter-cell interference. That is, JP algorithms attempt to direct transmission energy toward targeted UEs, while avoiding the generation of interference at other UEs. To operate effectively, JP systems require information about the transmission channels. There are two ways in which the channel information, or CSI, is fed back to system transmitters: Precoding Matrix Indicator (PMI) and quantized channel feedback.

PMI feedback, specified in LTE Release 8, is essentially a recommendation of a transmission format by each UE. A plurality of pre-defined precoding matrices are designed offline and known at both the base station and UE. The precoding matrices define various sets of downlink coding and transmission parameters. Each UE measures its channel, and searches through the precoding matrices, selecting one that optimizes some quantifiable metric. The selected precoding matrix is fed back or reported to the base station. The base station then considers all recommended precoding matrices, and selects the precoding and transmission parameters that implement a globally optimal solution over the cell. In the scenarios contemplated when Release-8 LTE was designed, PMI feedback works well, due to a high correlation between recommendations from UEs and the actual desirable transmission parameters. PMI feedback compression reduces uplink bandwidth by exploiting the fact that only part of the channel—the "strong directions," i.e., the signal space—needs to be fed back to the transmitter.

In JP CoMP applications, it is unlikely that the desired transmission format (which achieves interference suppression) will coincide with a transmission format recommended by a UE. No recommending UE has any knowledge about other UEs that will be interfered by the transmission to the recommending UE. Additionally, the recommending UE has no knowledge of transmissions scheduled to other UEs that will interfere with its signals. Also, PMI feedback compression reduces bandwidth by reporting only the part of the channel of interest to transmissions directed to the recommending UE. While this increases uplink efficiency for non-cooperative transmission, it is disadvantageous for cooperative transmission, as it denies the network information about the channel that may be useful in the JP optimization.

In quantized channel feedback, UEs attempt to describe the actual channel. In contrast to PMI feedback, this entails feeding back information about not only the signal space but also the complementary space (the "weaker space," also somewhat inaccurately referred to as the "null space") of the channel. Feedback of the whole channel results in several advantages. With full CSI available at the network, coherent JP schemes can suppress interference. Additionally, the network can obtain individualized channel feedback by transmitting unique reference symbols to each UE. This enables flexible and future-proof implementations of a variety of JP transmission methods, since the methods are essentially transparent to the UE.

Even without JP CoMP transmission, CSI at the network can solve one of the most fundamental problems plaguing current wireless system—the inaccuracy in channel-dependent link adaptation due to the network not being able to predict the interference experienced by the UEs (a problem closely related to the well-known flash-light effect, as described by Afif Osserain, etc. in the paper "Interference Mitigation for MIMO Systems Employing User-specific, Linear Precoding," PIMRC 2008). Once the network knows the CSI of bases near each UE, the network can accurately predict the SINR at each UE resulting in significantly more accurate link adaptation.

Even though the advantages of direct CSI over PMI feedback are clear, the major issue with direct CSI feedback is bandwidth. Full CSI feedback requires a high bitrate to transmit the CSI from each UE to the network. Time-frequency uplink channel resources must be used to carry the CSI feedback on the uplink channel, making these resources unavailable for transmitting user data on the uplink—the CSI feedback transmissions are thus pure overhead, directly reducing the efficiency of uplink data transmissions. Conveying direct CSI feedback to the network without consuming excessive uplink resources stands as a major challenge of modern communication system design.

SUMMARY

According to one or more embodiments described and claimed herein, accurate channel estimates are calculated based on infrequently transmitted CSI feedback data from a UE 20. A plurality of non-uniformly spaced digital CSI feedback samples, representing the frequency response of a downlink communication channel, is received from the UE. The received CSI feedback samples are demodulated and inverse quantized. A time domain tap delay channel model is generated from the inverse quantized CSI feedback samples. The time domain tap delay channel model may be frequency-transformed to obtain a reconstructed frequency response of the downlink communication channel in the frequency domain. Samples may be reported for a channel at different times, and the corresponding tap delay models jointly frequency-transformed. Alternatively, channel delays may be estimated based on prior delays and/or known references signals transmitted on the uplink. Channel estimates between CSI reporting instances may be predicted, such as by a sample & hold or a linear predictor. The delays may be presumed fixed, and Kalman filter coefficients evolved over time.

DETAILED DESCRIPTION

For the purpose of clear disclosure and full enablement, the present invention is described herein as embodied in a wireless communication network based on Orthogonal Frequency Division Multiplex (OFDM) modulation. More specifically, embodiments herein are based on the Evolved Universal Terrestrial Radio Access (E-UTRA) system, which is also commonly referred to as the Long-Term Evolution (LTE) of the widely deployed WCDMA systems. Those of skill in the art will readily appreciate that these systems are representative only and not limiting, and will be able to apply the principles and techniques of the present invention to a wide variety of wireless communication systems, based different access and modulation methods, given the teachings of the present disclosure.

Figure 1:
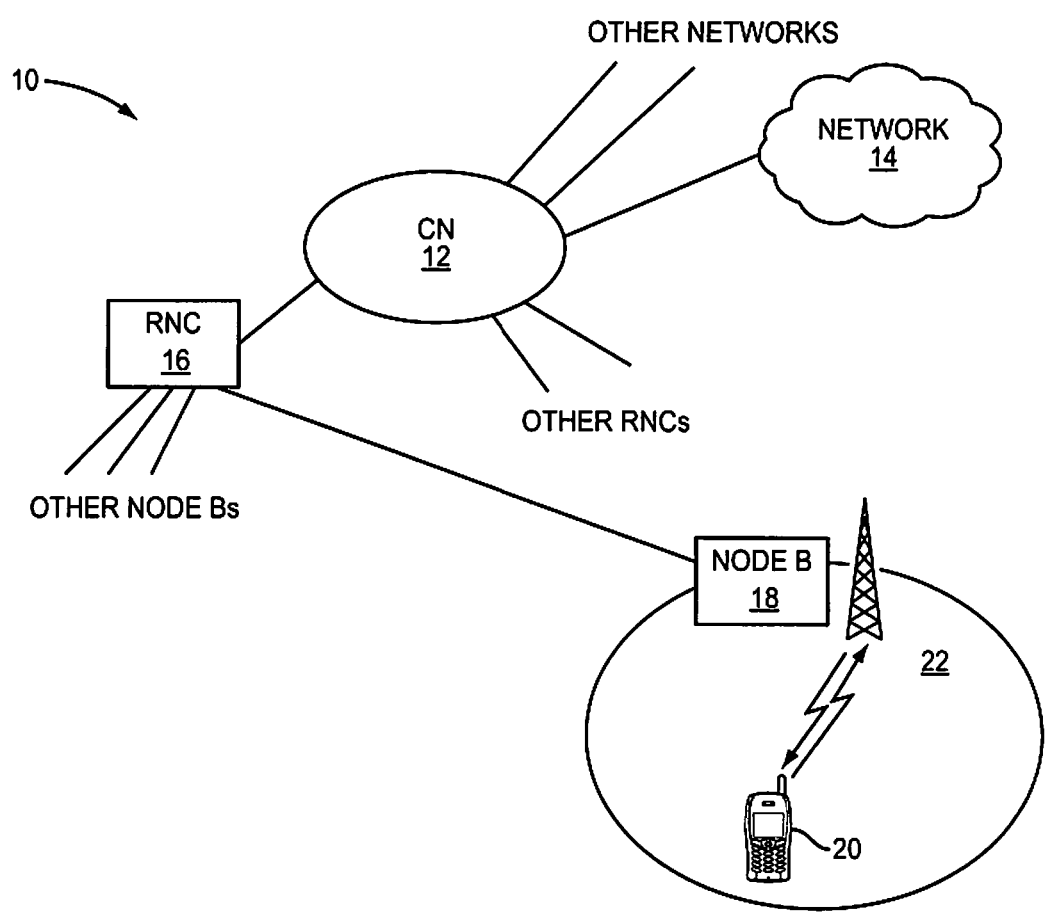
FIG. 1 is a functional block diagram of a wireless communication network.

FIG. 1 depicts a wireless communication network 10. The network 10 includes a Core Network (CN) 12, communicatively connected to one or more other networks 14, such as the Public Switched Telephone Network (PSTN), the Internet, or the like. Communicatively connected to the CN 12 are one or more Radio Network Controllers (RNC) 16, which in turn control one or more Node B stations 18. The Node B 18, also known as a base station, includes radio frequency (RF) equipment and antennas necessary to effect wireless radio communications with one or more user equipment (UE) 20 within a geographic region, or cell 22. As depicted, the Node B 18 transmits data and control signals to the UE 20 on one or more downlink channels, and the UE similarly transmits data and control signals to the Node B 18 on the uplink.

A system and method of estimating a downlink channel and efficiently reporting CSI feedback to the network 10 is described in U.S. patent application Ser. No. 12/555,966, titled "Efficient Uplink Transmission of Channel State Information," filed concurrently with the present application, assigned to the assignee of the present invention, and incorporated by reference herein in its entirety. Briefly, this reference described downlink channel characterization and efficient feedback to the network 10 as follows.

The frequency response of a channel at frequency f and time t can be expressed in terms of the time domain channel taps h(l; t) having delays $\tau_l$ as:

$$H(f;t) = \sum_{l=0}^{L-1} h(l;t) e^{-j2\pi f \tau_l}$$

At each reporting iteration or time t, the following steps are performed by the UE 20:

First, the UE 20 forms an estimate of the downlink channel at a number of sub-carriers, using known reference signals and standard techniques. These estimates are denoted by the following N×1 vector:

$$g(t) = [\hat{H}(f_1;t)\hat{H}(f_2;t)\Lambda\hat{H}(f_N;t)]^T$$

Where $\hat{H}(f; t)$ is the UE-estimated frequency response of the channel at frequency f and time t.

Second, for each reporting instant, the UE 20 forms a number of linear combinations of elements of g(t), i.e., the UE 20 multiplies the vector g(t) by a mixing matrix P(t), of size M×N, to get a new vector r(t) of size M×1, according to:

$$r(t) = P(t) \times g(t).$$

As described in the above-referenced copending patent application, P(t) may be formulated in many ways, and its elements may take on many values.

Third, each element of the product matrix r(t) is quantized using a quantizer $Q_r(\bullet)$ to obtain a number of bits, denoted as the vector b(t), representing the vector r(t). Finally, the bits in b(t) are transmitted to the network 10 on an uplink control channel.

Figure 2:
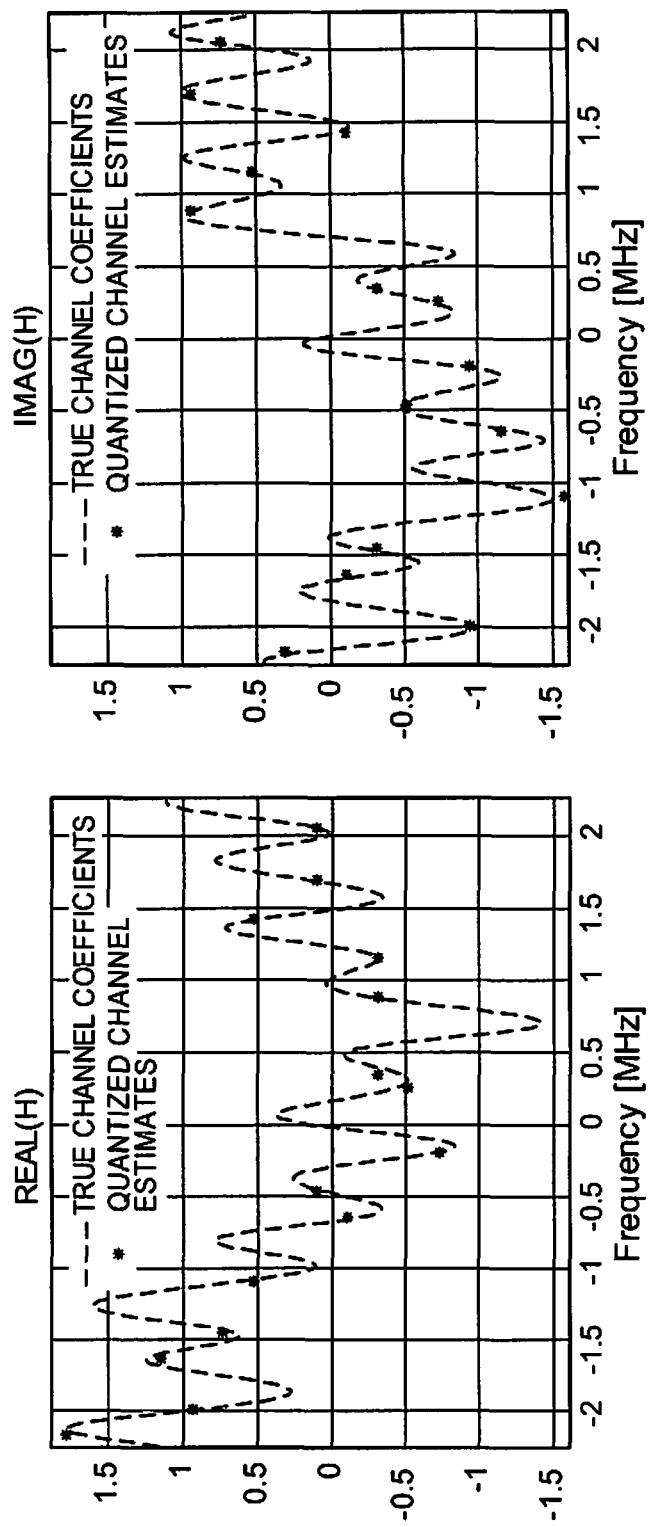
FIG. 2 depicts graphs of both in-phase and quadrature components of a representative channel response, depicting the quantized channel estimates reported by the UE to the network.

FIG. 2 depicts a representative downlink channel frequency response at one time, with the non-uniformly spaced digital samples that are selected, quantized, and transmitted as CSI feedback by the UE 20. The samples do not all lay precisely on the frequency response curves due to various sampling and quantization errors.

Figure 3:
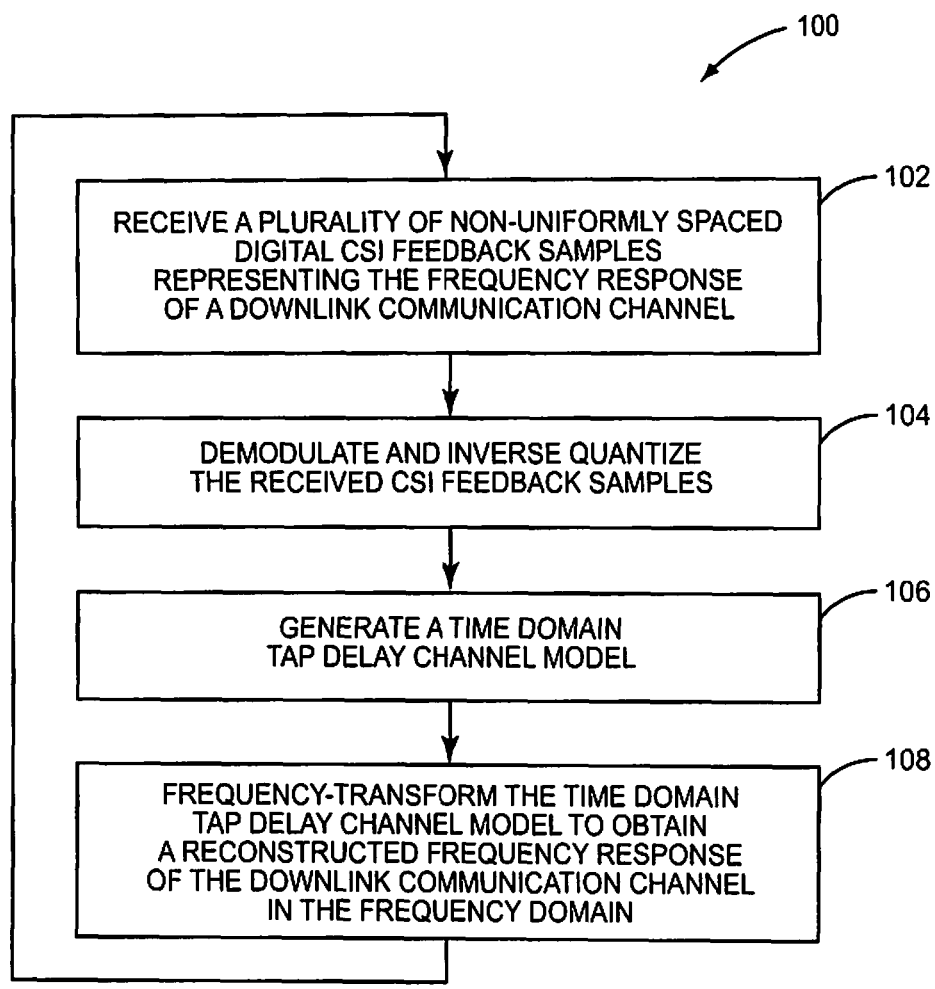
FIG. 3 is a flow diagram of a method of receiving and processing CSI feedback.

FIG. 3 depicts a method, according to one embodiment of the present invention, of receiving and processing CSI feedback from UE 20 in a wireless communication network 10. The network receives the quantized, non-uniformly spaced digital samples from the UE 20 on an uplink control channel (block 102). The bits received from the UE 20 are first demodulated by the network 10 using standard receiver, denoted as c(t).

The bits in c(t) are then operated on by an inverse of the quantizer $Q_r(\cdot)$ to yield an estimate of r(t) (block 104):

$$s(t) = [\hat{r}(t,1) \hat{r}(t,2) \Lambda \hat{r}(t,M)]$$

where $\hat{r}^s(\cdot)$ are estimates of the elements of the vector r(t) (block 104).

Figure 4:
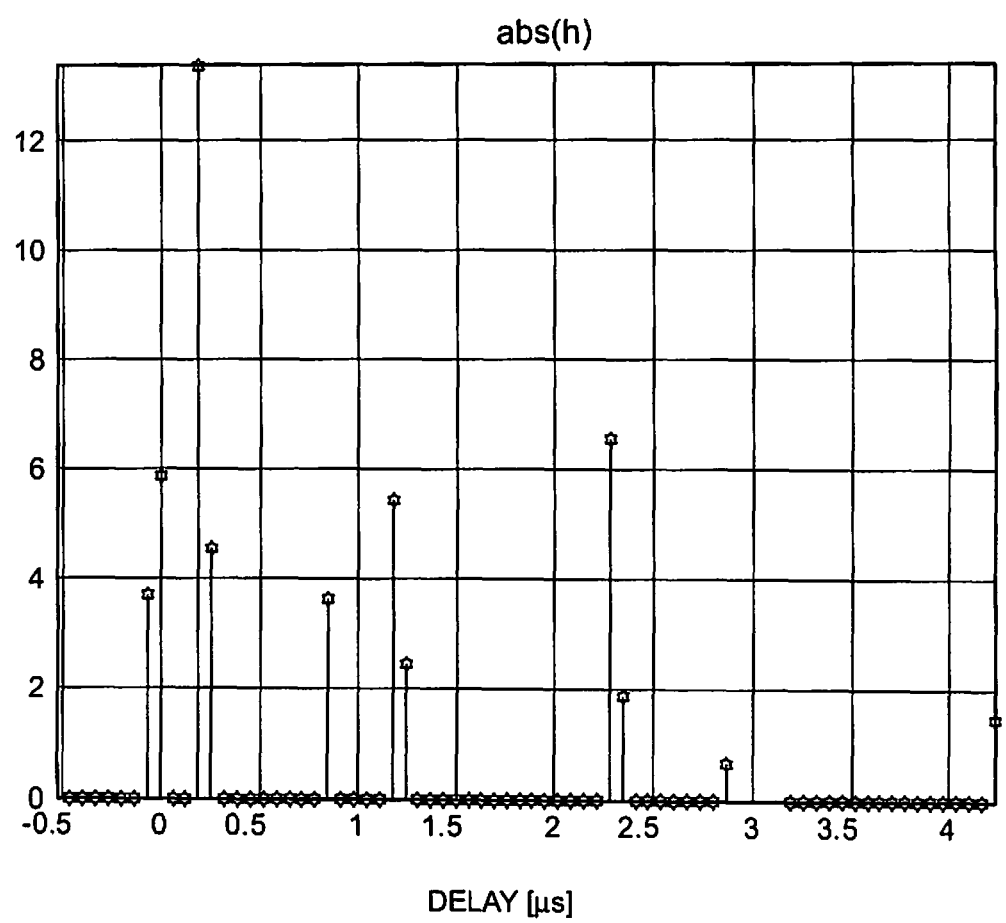
FIG. 4 is a graph of an estimated time domain tap delay channel model based on the CSI feedback of FIG. 3.

The network 10 applies channel estimation techniques to s(t) using the knowledge of P(t). The network 10 estimates the frequency response H(f; t) for all "f", not just for the frequencies that were included in formation of g(t) at the UE 20. In one embodiment, the network 10 accomplishes this by constructing a time domain tap delay channel model from s(t) (block 106), as depicted in FIG. 4. Without additional information, the range of potential delay taps preferably covers the full cyclic prefix length (e.g., 4.7 μs). Channel estimation and path searching are known in the art (see, for instance, the standard reference book *Digital Communications* by Proakis). Known methods can be adopted to construct a time domain tap delay channel model that is consistent with the frequency-domain observations in s(t).

More recently, convex optimization methods have been introduced to such channel estimation and path searching problems (see, for instance, "Special Issue on Compressive Sampling," *IEEE Signal Processing Magazine*, March 2008, the disclosure of which is incorporated herein by reference in its entirety). According to one embodiment, the time domain tap delay channel model should be constructed such that the number of nonzero taps is small. According to a second embodiment, the time domain tap delay channel model should be constructed such that the sum of the amplitudes of the time domain taps should be small. According to a third embodiment, the time domain tap delay channel model should be constructed such that the residue errors between the frequency-domain observations s(t) and the frequency transform of the time domain tap delay channel model should have small correlation with any of the rows of the mixing matrix P(t). As used herein, a "small" value means a value below a predetermined threshold.

Figure 5:
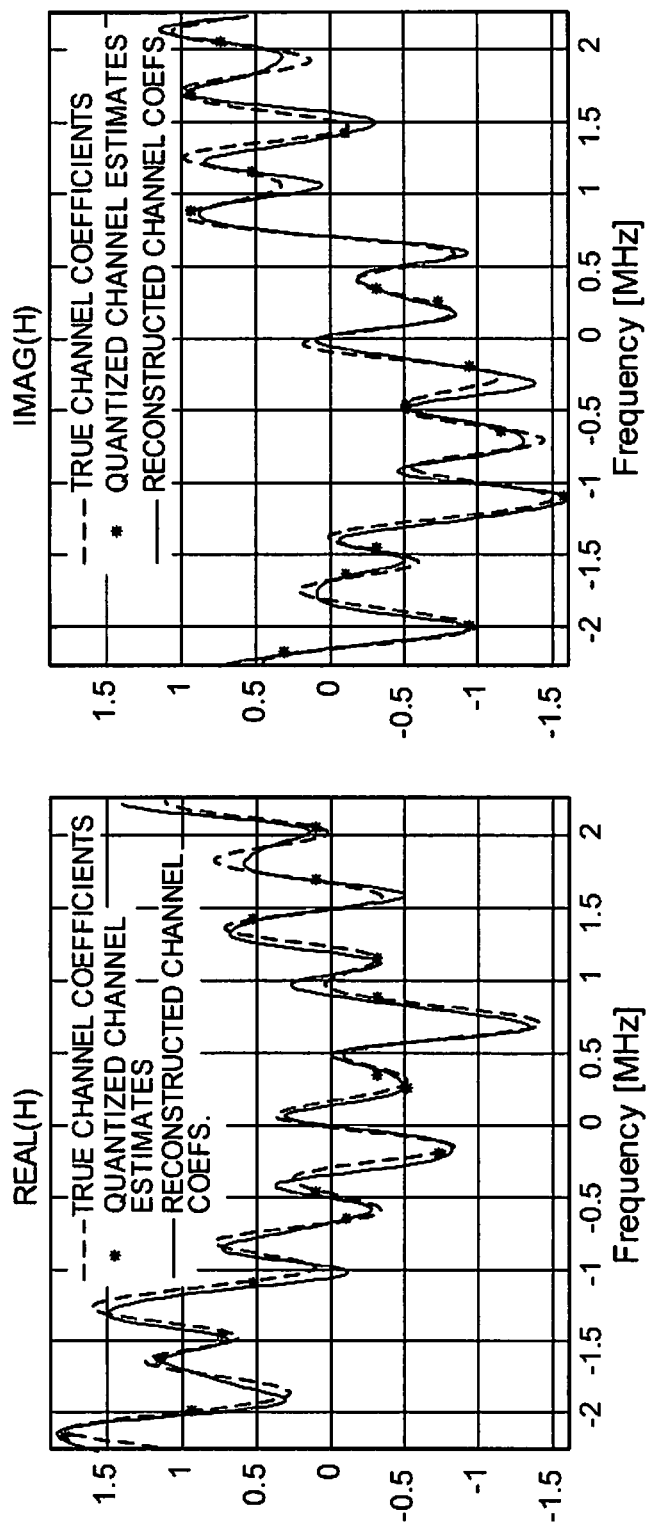
FIG. 5 depicts graphs of both in-phase and quadrature components of the downlink channel frequency response as reconstructed by the network based on the channel model of FIG. 4.

The sparse time domain tap delays are then frequency-transformed, such as by applying a Fast Fourier Transform (FFT) operation, to yield a reconstructed frequency domain response (block 108), as depicted in FIG. 5. As FIG. 5 demonstrates, the reconstructed frequency response closely matches the original frequency response (see FIG. 2). The mean square error (MSE) of frequency response reconstruction across the entire band is <15 dB.

Figure 6:
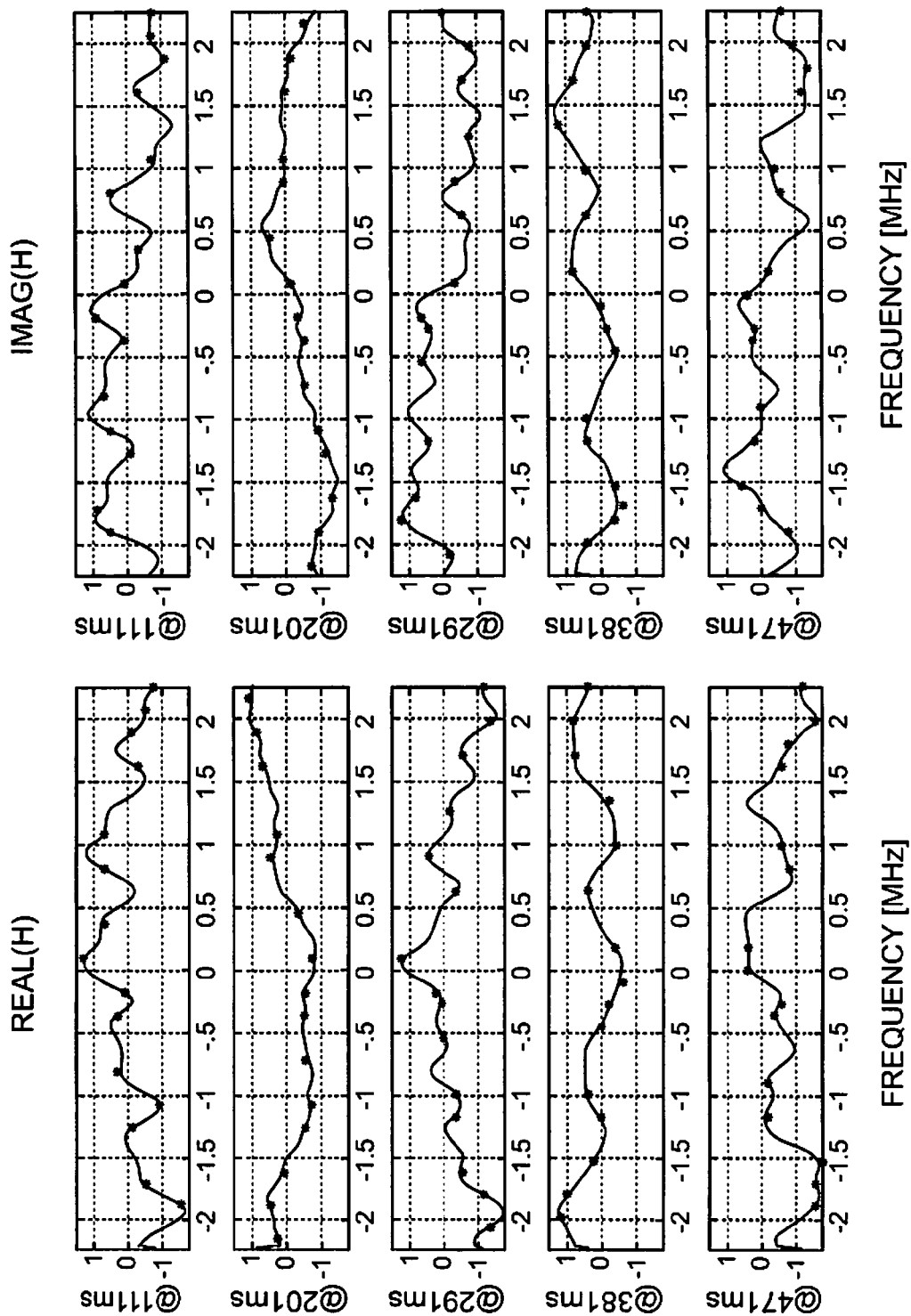
FIG. 6 depicts graphs of both in-phase and quadrature components of a representative channel responses at several times, depicting the quantized channel estimates selected by the UE.

FIG. 6 depicts five batches of CSI feedback samples, each derived from the downlink channel at different times. Each batch consists of 15 non-uniformly spaced digital samples, and the batches are fed back every 90 ms.

Figure 7:
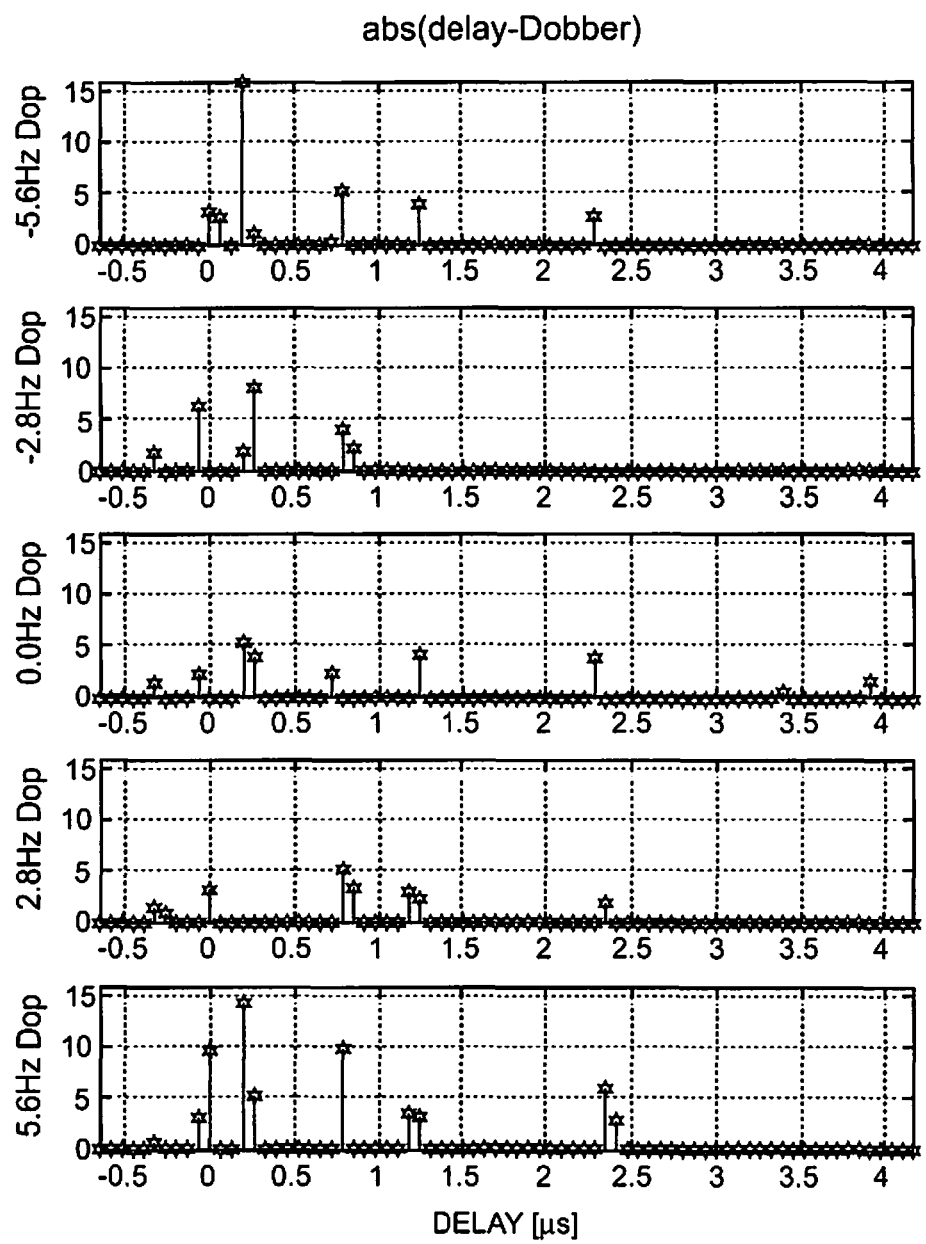
FIG. 7 depicts graphs of estimated time domain tap delay channel models, based on the CSI feedback of FIG. 6, for each of the selected times.
Figure 8:
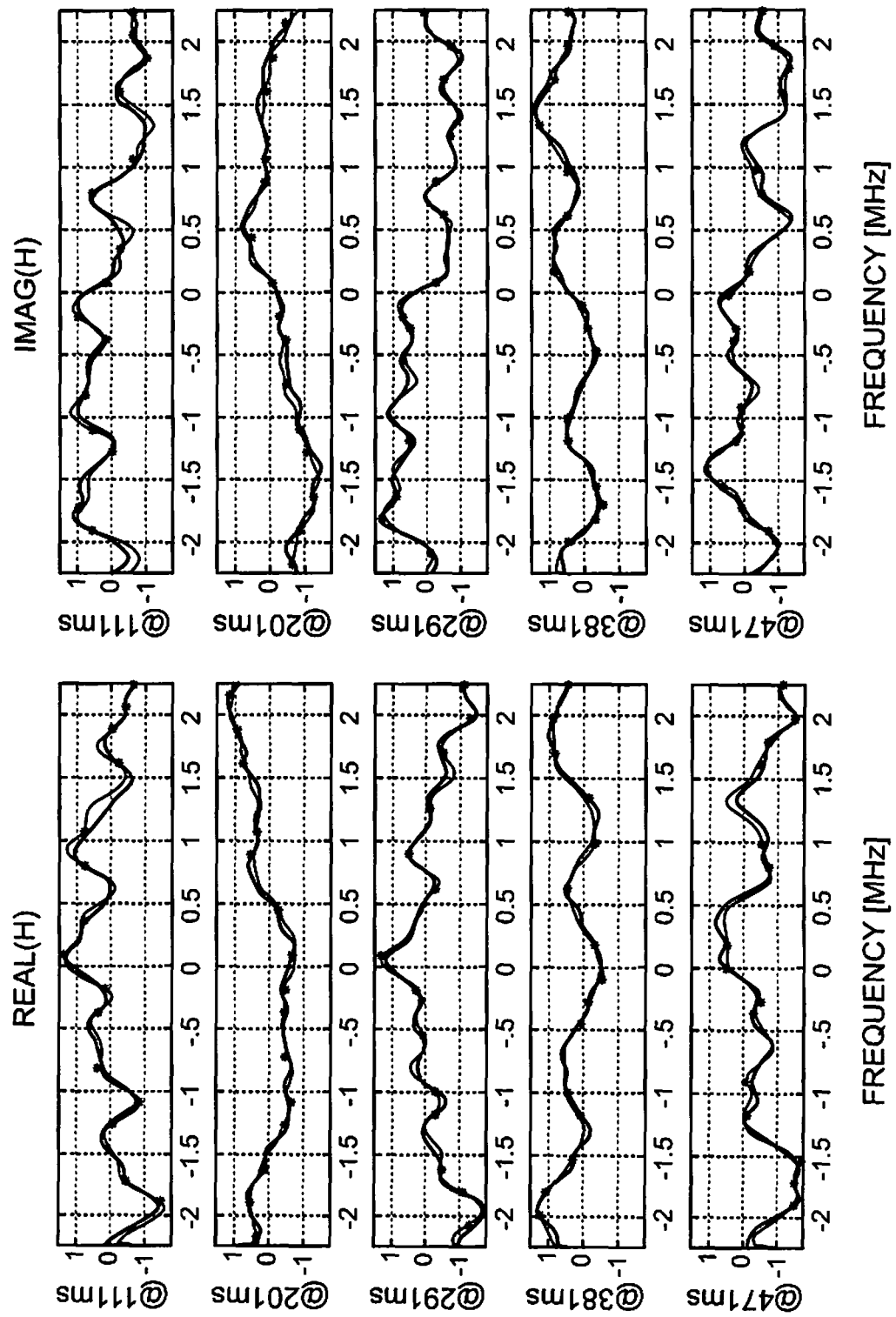
FIG. 8 depicts graphs of both in-phase and quadrature components of the downlink channel frequency response, as reconstructed by the network based on the channel models of FIG. 7, for each of the selected times.

FIG. 7 depicts corresponding sparse time domain tap delay models. Joint FFT operations are performed on these tap delay models, yielding the complete reconstructed frequency response curves depicted in FIG. 8.

Based on the s(t), the network 10 must form an estimate of the channel H(f; t) for all "f". In the following embodiments, the complexity of this estimation is reduced, and the performance improved, based on the particular structure of the problem. The channel response is estimated as:

$$H(f;t) = \sum_{l=0}^{L-1} h(l;t) e^{-j2\pi f \tau_l}.$$

From this equation, it is apparent that the estimation of the channel at all frequencies can be equivalently accomplished by estimating the pairs of (h(l; t), $\tau_l$)—that is, by estimating the delays and the corresponding channel coefficients. A channel estimation algorithm then attempts to search for set of delays, $\tau_l$, and the corresponding channel coefficients, h(l; t), that best fit the CSI feedback that the network 10 received from a UE 20.

The computational complexity of this channel estimation increases as the range (or the number of) delays, over which the search is performed, is increased. Furthermore, the accuracy of the estimated channel increases as the search is performed over a smaller range, since a smaller range effectively provides some a priori information about the possible valid delays.

In one embodiment, where a UE 20 periodically transmits CSI feedback reports, after each reporting instance, the network 10 has a set of estimated delays. The values of delays typically change much, much slower than the duration of one reporting interval. Accordingly, the network 10 may assume that the best estimated delays after the current report should be very close to the estimated delays obtained at the end of the last report. Hence, at each new report, the range of possible delays is limited to a small window around the previously estimated delays.

The position, relative to the UE 20 antenna and the Node B 18 antenna, of terrain, buildings, and other elements that scatter radio waves, determines the delay for a given channel coefficient. Since the same scatterers are present when the UE 20 transmits on the uplink as when the Node B 18 transmits on the downlink, the network 10 may assume that the uplink and downlink channels between the same pair of UE 20 antenna and Node B 18 antenna have the same set of delays.

Since the same scatterers are present when the UE transmit on the uplink as when the base station transmits on the downlink, it is reasonable to assume that the uplink and downlink channels between the same pair of UE antenna and network antenna have the same set of delays and Doppler shifts. If the UE transmits a known reference signal on the uplink, the network can estimate a set of delays and Doppler shifts for each channel between each network antenna (note that different network antennas can be located at different bases) and each UE antenna. These estimated delays and Doppler shifts, computed based on the uplink transmissions by the UE, can then be used to narrow the range of delays and Doppler shifts over which the search is performed. Two important advantages of using uplink transmissions are: (1) that one transmission by one UE is received by all the network antennas; hence, the amount of overhead associated with these uplink transmissions (enabling estimation of the delays and Doppler shifts on the uplink) can be quite small, and (2) all the channels from the antennas of one base station to the UE have exactly the same delays and Doppler shifts; hence, only one set of delays and Doppler shifts per base station need to be estimated for each UE.

In another embodiment, the UE 20 transmits a known reference signal on the uplink, and the network 10 estimates a set of delays for each channel between each network 10 antenna (note that different network 10 antennas can be located at different Node Bs 18) and each UE 20 antenna. In this embodiment, there will be a different set of delays for antennas located at each Node B 18. These estimated delays, computed based on the uplink transmissions by the UE 20, are then used to narrow the range of delays over which the search is performed.

An important advantage of using uplink transmissions is that one transmission by one UE 20 is received by all the network 10 antennas. Hence, the amount of overhead associated with these uplink transmissions (enabling estimation of the delay on the uplink) can be quite small.

With periodic CSI feedback reporting, new information about the channel is provided every feedback period. Between consecutive feedback reports, however, the network must rely on predictions of the channel values. Keeping the reporting interval as long as possible would minimize the CSI feedback rate and associated overhead. On the other hand, keeping the reporting interval short increases the accuracy of prediction. The optimal feedback reporting interval is thus determined, at least in part, on the network's ability to accurately predict the channel estimate between CSI feedback reports—the better the prediction, the less often CSI feedback needs to be reported.

In one embodiment, the network 10 employs a "sample & hold" predictor, in which the prior calculated channel estimate is used as the predicted channel value. In another embodiment, the network 10 employs a "linear" predictor, in which a linear combination of prior calculated channel estimates is used as the predicted channel value. Standard linear estimation/prediction methods are used to find the optimal choice of coefficients for the linear predictor, given the second-order statistics (i.e., correlation) of the prior channel estimates calculated based on UE 20 CSI feedback. Note that, in one embodiment, the network 10 may switch between sample & hold and linear predictors as required to maximize the overall prediction accuracy.

Figure 9:
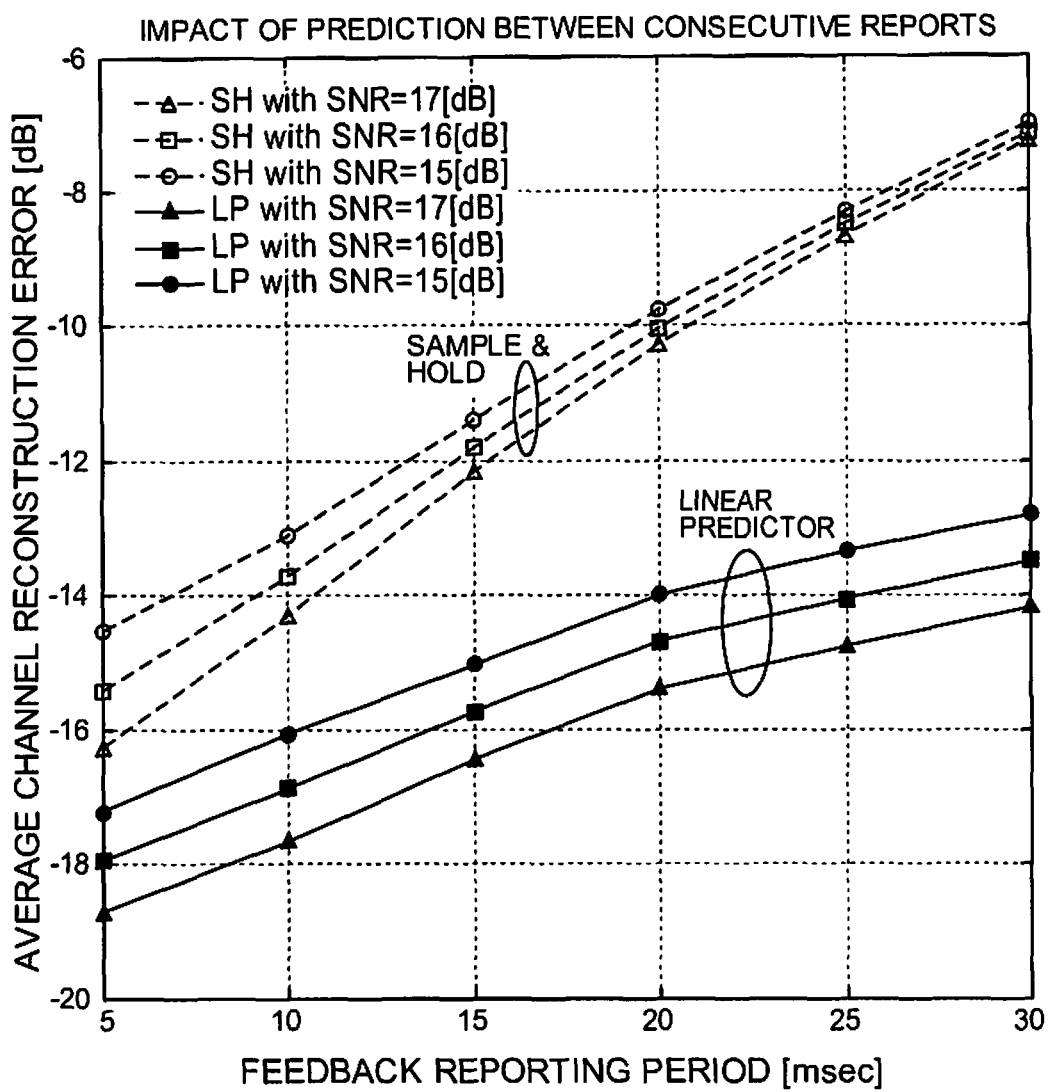
FIG. 9 depicts a graph of MSE reconstructed channel estimate errors for sample & hold and linear predictive models.

FIG. 9 graphs the MSE of channel reconstruction error as a function of the reporting period T (assuming a UE speed of 3 kph and carrier frequency of 2 GHz). The three doted curves depict the error under a sample & hold predictor, and the three solid lines curves depict the error when a linear predictor is used between consecutive CSI reports. The channel reconstruction error at the input of the predictor is varied from 15 to 17 dB. Under the test conditions graphed in FIG. 5, it is apparent that for a given average reconstruction error, the linear predictor requires less frequent CSI reporting (i.e., longer reporting interval) compared to the sample & hold predictor.

In practice, estimated delays should remain constant for a number of consecutive CSI reporting intervals. Assuming a set of fixed delays over a number of reporting intervals, the choice of coefficients (one coefficient for each delay) that results in the minimum MSE channel reconstruction error can be obtained by applying a Kalman filter to consecutive reports from the UE 20, as described by Brain Anderson and John Moore in the book *Optimal Filtering* (Dover Publications, 2005), the disclosure of which is incorporated herein by reference in its entirety.

With fixed delays, the vector s(t) for each t can be expressed as a linear and possibly time-varying function of the channel coefficients. Furthermore, the evolution of channel taps over time can be modeled as the output of a linear time-invariant system driven by white noise. In one embodiment, these two expressions are combined, and Kalman filtering is applied to generate the minimum MSE channel estimation, given the fed back CSI data.

Network 10 embodiments processing CSI feedback data, as described herein, increase the accuracy of channel estimation and reduce the feedback channel bandwidth.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of receiving and processing Channel State Information (CSI) feedback from User Equipment (UE) in a wireless communication network, comprising:
   receiving, from a UE, a plurality of batches of digital CSI feedback samples, each representing a direct estimate of the frequency response of the downlink communication channel at a different time, and wherein the samples are non-uniformly spaced within each batch;
   demodulating and inverse quantizing each batch of CSI feedback samples;
   generating a plurality of time domain tap delay channel models from the inverse quantized CSI feedback samples, each model corresponding to a channel sample time; and
   jointly frequency-transforming the plurality of time domain tap delay channel models to obtain each of a plurality of reconstructed frequency responses, each representing the frequency response of the downlink communication channel at a time corresponding to the CSI feedback samples.

2. The method of claim 1 further comprising performing adaptive modulation and coding based on the reconstructed frequency response of the downlink communication channel.

3. The method of claim 1 wherein frequency-transforming the time domain tap delay channel model comprises applying a Fast Fourier Transform to the tap delays.

4. The method of claim 1 wherein the range of time domain tap delays is at least as long as the length of a cyclic prefix appended to a downlink data symbol.

5. A method of receiving and processing Channel State Information (CSI) feedback from User Equipment (UE) in a wireless communication network, comprising
   receiving, from a UE, a plurality of non-uniformly spaced digital CSI feedback samples representing direct estimates of the frequency response of a downlink communication channel;
   demodulating and inverse quantizing the received CSI feedback samples; and
   searching for a set of time domain delay values and the corresponding channel coefficients that best fit the received CSI feedback samples.

6. The method of claim 5 wherein searching for a set of time domain delay values comprises searching over a window around previously estimated delays.

7. The method of claim 5 wherein searching for a set of time domain delay values comprises searching for time domain delay values in an uplink channel from the UE.

8. The method of claim 5 wherein searching for a set of time domain delay values comprises:
   receiving a known reference signal from the UE;
   estimating a set of delays for each channel between each transmitting UE antenna and each receiving network antenna;
   defining, for each channel, a delay window based on the estimated uplink delays; and
   searching, for each channel, for time domain delay values within the delay window.

9. The method of claim 8 wherein searching, for each channel, for time domain delay values within the delay window further comprises searching for only one set of time domain delay values for all transmit antennas located at a base station.

10. The method of claim 5 wherein searching for a set of time domain delay values comprises searching a set of non-zero delay values, the set size below a predetermined threshold.

11. The method of claim 5 wherein searching for a set of time domain delay values comprises searching a set of delay values wherein the sum of amplitudes is below a predetermined threshold.

12. The method of claim 5 wherein searching for a set of time domain delay values comprises searching a set of delay values such that the residue errors between the frequency-domain observations and the frequency transform of the time domain tap delay values have a correlation, with any of the rows of a matrix, below a predetermined threshold.

13. The method of claim 11 wherein the rows of a matrix comprise the rows of a mixing matrix.

14. The method of claim 5 further comprising periodically repeating the method steps.

15. The method of claim 14 further comprising predicting an estimate of the downlink channel between instances of receiving CSI reports from the UE.

16. The method of claim 15 wherein predicting an estimate of the downlink channel comprises using a prior calculated estimate of the downlink channel as the predicted estimate.

17. The method of claim 16 wherein the prior calculated estimate of the downlink channel is the most immediately prior calculated estimate.

18. The method of claim 17 wherein predicting an estimate of the downlink channel comprises calculating a linear combination of prior calculated estimates of channel values is used as the predicted channel value.

19. The method of claim 15 wherein predicting an estimate of the downlink channel comprises selecting a Kalman filter coefficient for each delay value that result in the minimum MSE channel reconstruction error over two or more iterations of CSI reporting.

20. The method of claim 19 wherein the delay values are fixed, and wherein a vector of reconstructed channel estimates comprises a linear function of the channel coefficients.

21. The method of claim 20 wherein the evolution of channel taps over time is modeled as the output of a linear time-invariant system driven by white noise.

* * * * *